United States Patent [19]
Dillen et al.

[11] Patent Number: 5,434,429
[45] Date of Patent: Jul. 18, 1995

[54] IMAGE SENSING DEVICE WITH CIRCUIT LAYOUT ALIGNMENT PATTERN

[75] Inventors: Bartholomeus G. M. H. Dillen; Rudolph M. Snoeren, both of Eindhoven, Netherlands

[73] Assignee: U.S. Philips Corporation, New York, N.Y.

[21] Appl. No.: 201,604

[22] Filed: Feb. 25, 1994

[30] Foreign Application Priority Data

Mar. 1, 1993 [EP] European Pat. Off. ............ 93200560

[51] Int. Cl.$^6$ ............................................. G01N 21/86
[52] U.S. Cl. ................... 250/559.3; 250/208.1
[58] Field of Search .................. 250/208.1, 208.2, 216, 250/561; 356/400, 401

[56] References Cited

U.S. PATENT DOCUMENTS 4,712,018 12/1987 Stoffel et al. ..................... 250/208.1

FOREIGN PATENT DOCUMENTS 0518185 12/1992 European Pat. Off. .
3315882 11/1984 Germany .
58-7989 1/1983 Japan .

*Primary Examiner*—David C. Nelms
*Attorney, Agent, or Firm*—Jack D. Slobod

[57] ABSTRACT

Accurately aligning opto-electronic image sensors with respect to a beam-splitter being comprised in an image sensing device is facilitated by incorporating an alignment pattern in the conductive metal stripes of the opto-electronic image sensors. When simultaneously viewed through the input face of the beam-splitter, alignment patterns of respective opto-electronic image sensors form a combined alignment patterns showing the accuracy of the alignment of the opto-electronic image sensors. By providing differences between pitches of the alignment patterns on either side of an axis of reflection, a combined alignment pattern is obtained showing various types of alignment errors, such as horizontal or vertical translation, or rotations. Quantification of alignment errors is facilitated by making use of vernier action in the combined alignment pattern.

5 Claims, 4 Drawing Sheets

IMAGE SENSING DEVICE WITH CIRCUIT LAYOUT ALIGNMENT PATTERN

The invention pertains to an image sensing device comprising beam-splitting means for splitting an image carrying radiation beam into a plurality of sub-image carrying radiation beams, and comprising, for recording each of the sub-images, a plurality of opto-electronic image sensors each having a circuit lay-out. The invention also relates to an x-ray examination apparatus comprising such an image sensing device.

An image sensing device of said kind is known from the German Offenlegungsschrift DE 39 15 882.

In the cited reference an x-ray examination apparatus is described comprising an image sensing device having two opto-electronic image sensors and a beam-splitting prism. An image carrying light beam is split into a transmitted light beam and a reflected light beam. By a first and a second opto-electronic image sensor the transmitted and reflected light beams, respectively, are detected. The opto-electronic image sensors are arranged in a shifted manner, such that picture elements (pixels) registered by the first opto-electronic image sensor fall within interstices of picture elements registered by the second opto-electronic image sensor and vice versa. By the opto-electronic image sensors sub-images are converted into video signals of sub-images. By a recombination circuit said electronic sub-images are recombined into a video signal of a recombined image having an improved spatial resolution as compared to any of the sub-images.

A problem of the known image sensing device is that it is difficult and elaborate to accomplish the required accurate alignment of the opto-electronic image sensors.

It is inter alia an object of the invention to provide an image sensing device having a plurality of opto-electronic image sensors comprising means for accurately aligning said opto-electronic sensors with respect to one another. It is also an object of the invention to provide an image sensing device having a plurality of opto-electronic sensors comprising means for quantifying alignment of said senors mounted in the image sensing device.

This object is achieved in that an image sensing device according to the invention is characterized in that each opto-electronic image sensor is provided with an alignment pattern formed by at least part of its circuit lay-out.

The spatial resolution and image-quality of the recombined image produced by an image sensing device in according to the invention by assembly from primary sub-images from respective opto-electronic image sensors is improved by aligning said opto-electronic image sensors accurately with respect to one another. Opto-electronic circuits are integrated circuits and they comprise circuit-means in the form of conducting metallic or doped polycrystalline semiconductor (e.g. polysilicon or a combination of polysilicon and silicide) stripes disposed on a semiconductor substrate. These conducting stripes are arranged in a circuit lay-out which corresponds to the electronic function of the circuit-means. The conducting stripes are distinguishable from the semiconductor substrate onto which they are disposed. In accordance with the invention the circuit-lay out is adapted without altering its electronic function so as to also form an alignment pattern. The alignment patterns of each opto-electronic image sensor are assembled into a combined alignment pattern which is employed for accurately aligning respective opto-electronic image sensors. A particular advantage is achieved in that no additional scarce space on the light-sensitive faces is required for providing an alignment pattern.

It is known per se from the Japanese Patent Application JP 58-7089 that accurate alignment of optoelectronic opto-electronic image sensors with respect to a prism on which they are mounted, is performed by means of separate patterns provided on the optoelectronic image sensors especially for carrying out aligning. Such separate patterns need additional space which is then no longer available for the light-sensitive face of the opto-electronic image sensors.

A preferred embodiment of an image sensing device according to the invention is characterised in that said alignment pattern has a first pattern-part having a first pitch and second pattern-part having a second pitch, said first and second pitches being in the same direction and their magnitudes being different.

When the opto-electronic image sensors are viewed such that the alignment patterns of said opto-electronic image sensors are observed simultaneously, a combined alignment pattern is observed. The combined alignment pattern is notably formed by the overlay of respective alignment patterns when they are viewed simultaneously of each of the opto-electronic image sensors. Each alignment pattern of each opto-electronic image sensor comprises stripes which are separated by some distance. This distance is the magnitude of the pitch between said stripes. The direction of said distance which separates stripes is the direction of said pitch. Thus, a pitch is a vector which determines (a part of) an alignment pattern. The first pattern-part of the alignment pattern of one opto-electronic image sensor and the second pattern-part of the alignment pattern of another opto-electronic image sensor are assembled by overlay into a combined alignment pattern which is suited for mutual alignment of said opto-electronic image sensors.

In particular, when the opto-electronic image sensors are mounted on a beam-splitter having a reflection means, alignment patterns of opto-electronic image sensors viewed in transmission through the beam-splitter are seen directly and mirrored images are of alignment patterns of opto-electronic image sensors viewed in reflection through the beam-splitter. Thus, a combined alignment pattern is formed by overlay of an alignment pattern of an opto-electronic image sensor and an alignment pattern of another opto-electronic image sensor that is reflected with respect to an axis of reflection of the alignment pattern. An alignment pattern of each opto-electronic image sensor has according to the invention preferably different pitches on either side of said axis of reflection. A part with a larger pitch of the alignment part of one opto-electronic image sensor is combined with a part with a smaller pitch of another opto-electronic image sensor in the combined alignment pattern which is assembled from alignment patterns of respective opto-electronic image sensors.

A further preferred embodiment of an image sensing device according to the invention is characterised in that said alignment pattern has a first pattern-part having a first pitch and a second pattern-part having a second pitch, directions of said first and second pitches being coincident upon reflection of one of said directions by a reflection means incorporated in the beam-splitting means, and their magnitudes being different.

In order to obtain a suitable combined alignment pattern from the alignment pattern of opto-electronic image sensors viewed in transmission and viewed in reflection, respectively, it should be recognised that a first pattern-part of a opto-electronic image sensor viewed in transmission co-operates with a second pattern-part of a opto-electronic image sensor viewed in reflection. Therefore, the first and second pattern parts of the alignment pattern employed in each opto-electronic image sensor are arranged such that direction of the first pitch in the first pattern-part seen in transmission coincides with the direction of the second pitch in the second pattern-part.

A further preferred embodiment of an image sensing device according to the invention is characterised in that said alignment pattern has a first pattern-part comprising a first portion having a first pitch and a second portion having a second pitch and that said alignment pattern has a second pattern-part comprising a third portion having a third pitch and a fourth portion having a fourth pitch, directions of said first and fourth pitches being coincident upon reflection of one of said directions by a reflection means incorporated in the beam-splitting means, and their magnitudes being different, and directions of said second and third pitches being coincident upon reflection of one of said directions by said reflection means, and their magnitudes being different.

Providing an alignment pattern comprising portions having pitches in different directions and said pitches having different magnitudes furnishes means for registering alignment errors in independent directions. This provides for accurately identifying types of misalignment such as horizontal or vertical translational misalignment or rotational misalignment. Thus, notably alignment errors associated with rotation of opto-electronic image sensors around optical axes of the beam-splitter can be adequately registered.

An x-ray examination apparatus preferably comprises an image sensing device comprising beam-splitting means for splitting an image carrying radiation beam into a plurality of sub-image carrying radiation beams, and comprising a plurality of image opto-electronic image sensors each having a circuit lay-out for sensing each of the sub-images, and comprising recombination means for recombining sub-images into a recombined image, characterised in that each image opto-electronic image sensor is provided with an alignment pattern formed by its circuit lay-out. In particular in x-ray imaging, improving spatial resolution is advantageous so as to improve diagnostic quality of x-ray images produced by the x-ray apparatus.

These and other aspects of the invention will become apparent from and elucidated with reference to the embodiments described hereinafter and with reference to the accompanying drawings.

Figure 5A:
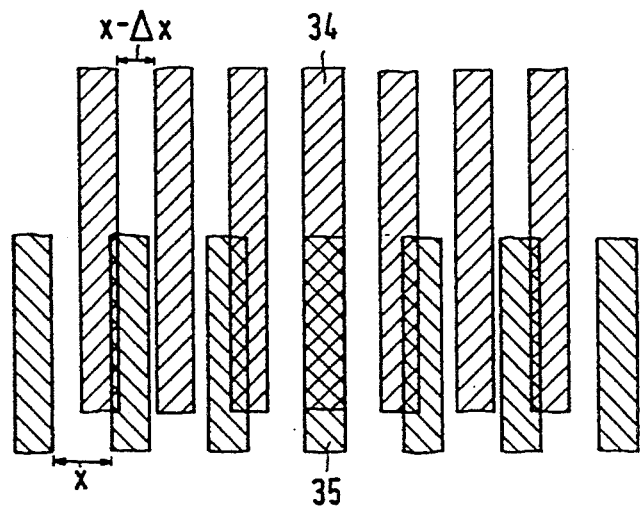
Figure 5B:
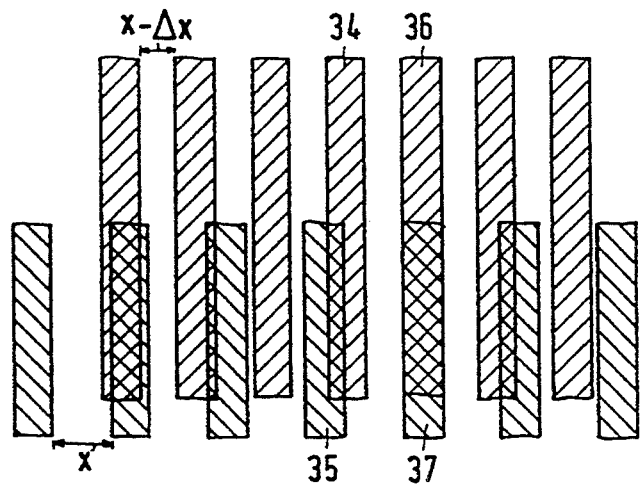
Figure 5C:
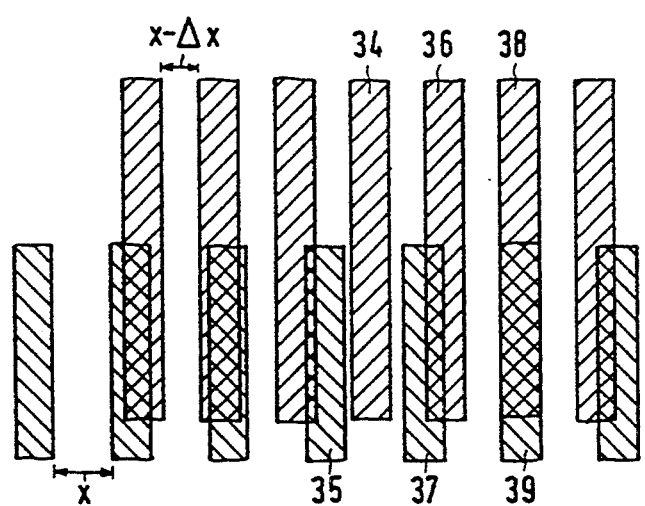

FIGS. 5a–c show images of respective parts of combined alignment patterns of two optoelectronic opto-electronic image sensors having alignment at various accuracies with respect to a beam-splitter.

Figure 1:
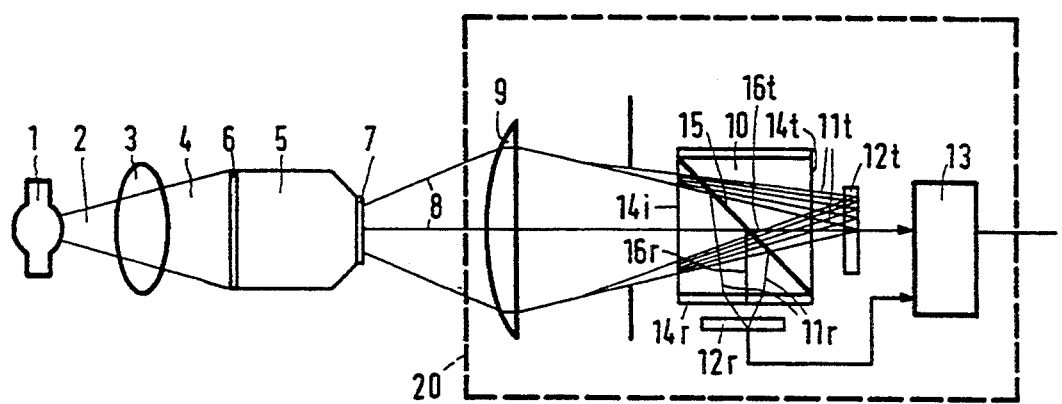
FIG. 1 shows a schematic diagram of an x-ray examination apparatus incorporating an image sensing device comprising a beam-splitter and two opto-electronic image sensors.

FIG. 1 shows a schematic diagram of an x-ray examination apparatus incorporating an image sensing device according to the invention comprising a beam-splitter and two opto-electronic image sensors in the form of opto-electronic image sensors. An x-ray source 1 is provided for generating a beam of x-rays 2 for irradiating an object 3, notably a patient. The x-rays are attenuated by the object and thereby an image carrying x-ray beam 4 is formed, which enters an x-ray image intensifier 5 having an input-screen 6 and an output-screen 7. The image carrying x-ray beam 4 is converted into a beam 8 of image carrying visible radiation by the x-ray image intensifier. By way of an optical arrangement 9 and a beam-splitter 10, the image carrying light beam 8 is divided into a transmitted light beam 11t and a reflected light beam 11r which are focused onto opto-electronic image sensors 12t and 12r, respectively. The opto-electronic image sensors 12t and 12r are arranged such that pixels of one opto-electronic image sensor correspond to interstices of the other opto-electronic image sensor and vice versa. Video signals for sub-images generated by the opto-electronic image sensors are supplied to a recombination circuit 13. A video signal of a recombined image having an improved spatial resolution as compared to the spatial resolution of at least one of the sub-images is assembled by the recombination circuit from said video signals of sub-images generated by the opto-electronic image sensors.

It is required that the respective opto-electronic image sensors are accurately aligned with respect to principal rays 16t and 16r passing through the beam-splitter 10 for adequate operation of the image sensing device 20 for successfully producing a video signal for a recombined image having improved resolution. The alignment with respect to respective principal rays also ensures accurate alignment of the opto-electronic image sensors with respect to one another. To that end an image sensing device according to the invention is provided with opto-electronic image sensors having an alignment pattern formed by at least part of the circuit-lay out of the opto-electronic image sensors.

Figure 2:
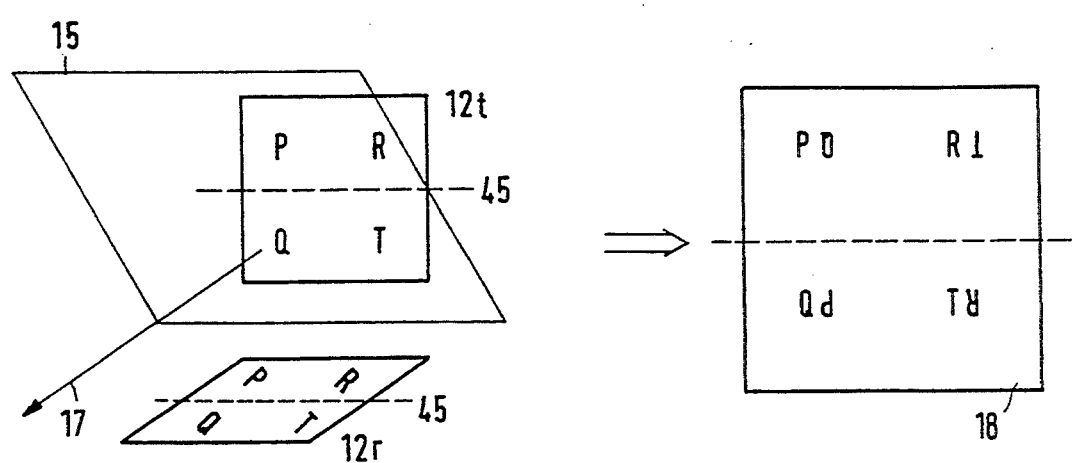
FIG. 2 shows diagrammatically the forming of a combined alignment pattern of two opto-electronic image sensors arranged on a beam splitter in an image sensing device according to the invention

FIG. 2 shows diagrammatically forming of a combined alignment pattern from alignment patterns of two opto-electronic image sensors arranged on a beam-splitter in an image sensing device according to the invention.

The opto-electronic sensors 12r and 12t are shown each having an alignment pattern having parts indicated as P, Q, R and T. Both opto-electronic image sensors can be viewed simultaneously along a fine of sight 17. The sensor 12t is viewed through the semi-transparent reflector 15, directly and of the opto-electronic sensor 12r an image is seen through the semi-transparent reflector 15, that is reflected with respect to the axis 45. The resulting combined alignment pattern 8 formed by overlaying images of the alignment pattern of optoelectronic sensor 12*t* and the mirrored alignment pattern of opto-electronic sensor 12*r*. As the combined alignment pattern 18 shows parts of the alignment pattern of one opto-electronic sensor overlaying with reflected parts of another opto-electronic sensor, e.g. part P of sensor 12*t* overlays in the combined pattern with mirrored part Q of opto-electronic sensor 12*r*.

Figure 3:
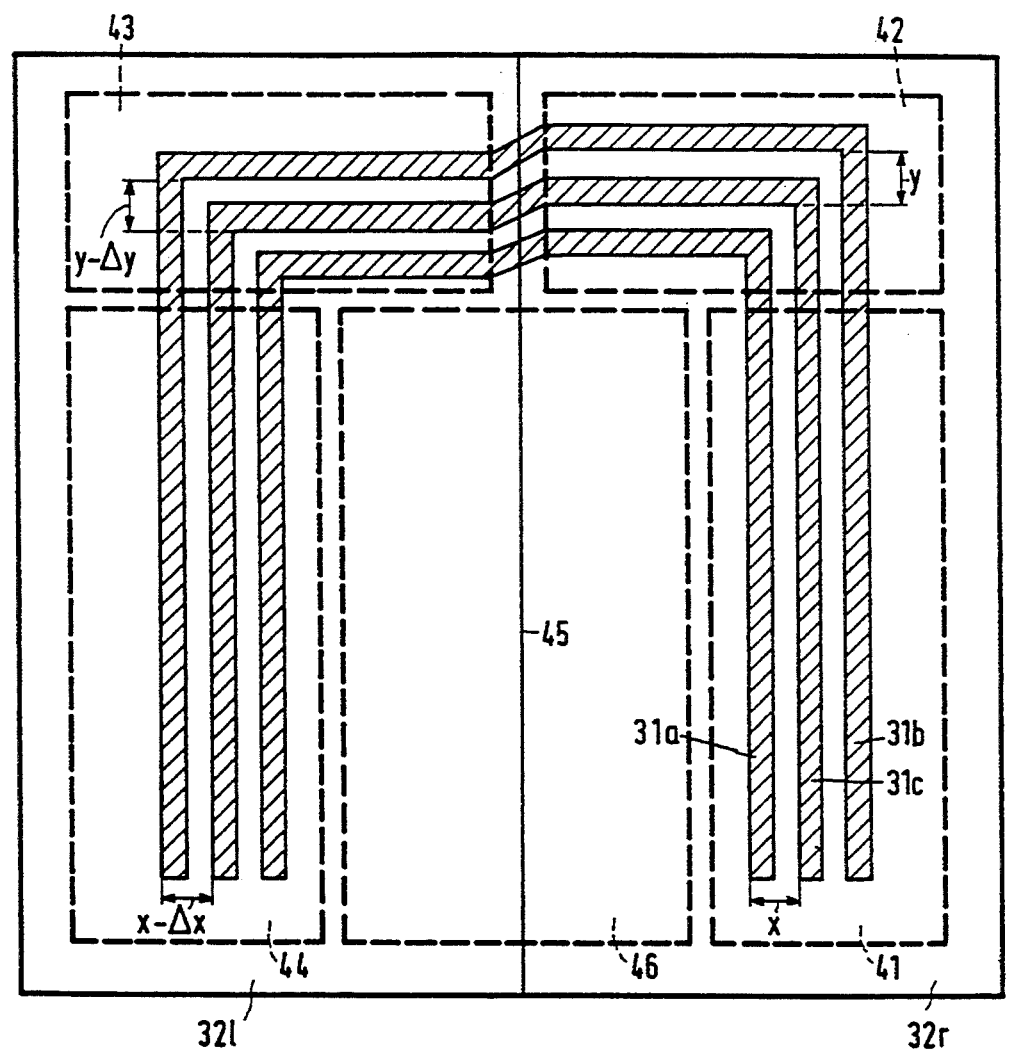
FIG. 3 shows an example of an alignment patterns for use in an image sensing device according to the invention.

FIG. 3 shows an example of an alignment pattern for use in an image sensing device according to the invention. In particular, a part of a circuit pattern of an opto-electronic image sensor for use in an image sensing device is shown. A part of the conductive stripes incorporated in the opto-electronic integrated circuit is shown. Conductive stripes 31 are shown, which are at least a part of the circuit-lay out e.g. for carrying-off image signals read-out from light-sensitive elements of the opto-electronic image sensor. Such light-sensitive elements are e.g. provided for in a region 46 of the area of the integrated circuit. Conductive stripes 31*a*, 31*b*, 31*c* being part of the circuitry of each of the opto-electronic image sensors 12*t* and 12*r*, are laid-out so as to form a pattern having two parts, a left-hand side first pattern-part 32*l* and a right-hand side second pattern-part 32*r*. As an example, in FIG. 3 an alignment pattern having a three-fold set of stripes is shown. The alignment pattern has a first pitch of a magnitude x in a first direction viz. the horizontal direction in the right-hand side part 32*r* in a first portion 41. In a fourth portion 44 in the left-hand side 32*l* a fourth pitch also in the horizontal direction has a magnitude x-Δx that differs from the corresponding pitch in the right-hand side 32*r*. Similarly, the alignment pattern has different second and third pitches, viz. a magnitude y in a second portion 42 and a magnitude y-Δy in a third portion 43, in a second direction viz. the vertical direction in the right-hand side and in the left-hand side of the alignment pattern, respectively. Alignment of the opto-electronic image sensors with respect to the beam-splitter can accurately be carried out by employing opto-electronic image sensors each having the alignment pattern described hereinbefore. When aligning opto-electronic image sensors with respect to the beam-splitter, both of the opto-electronic opto-electronic image sensors are viewed from the input face 14*i* of the beam-splitter. Together with the opto-electronic image sensors also their respective alignment patterns are simultaneously viewed. Because of the reflection by the beam-splitter, the alignment pattern of the opto-electronic image sensor 12*r* is seen as a mirror image. The alignment pattern of the opto-electronic image sensor 12*t* is viewed directly. Thus, simultaneously the alignment pattern of one opto-electronic image sensor and the reflected image of the alignment pattern of the other opto-electronic image sensor are seen, so that a combined alignment pattern is viewed. The axis of reflection 45 of the alignment pattern is shown in FIG. 3 in the vertical direction. First and fourth pitches being in the horizontal direction and first and fourth pitches being in pattern-parts on different sides of the axis of reflection implies that directions of the first and fourth pitches are mirror images of one another. Second and third pitches being in the vertical direction and being on different sides of the axis of reflection implies that directions of the second and third pitches are mirror images of one another. Accurate alignment and mutual centring of the opto-electronic image sensors is achieved by displacing the opto-electronic image sensors so as to achieve coincidence of central stripes 31*c* of alignment patterns of either opto-electronic image sensor viewed simultaneously.

Figure 4:
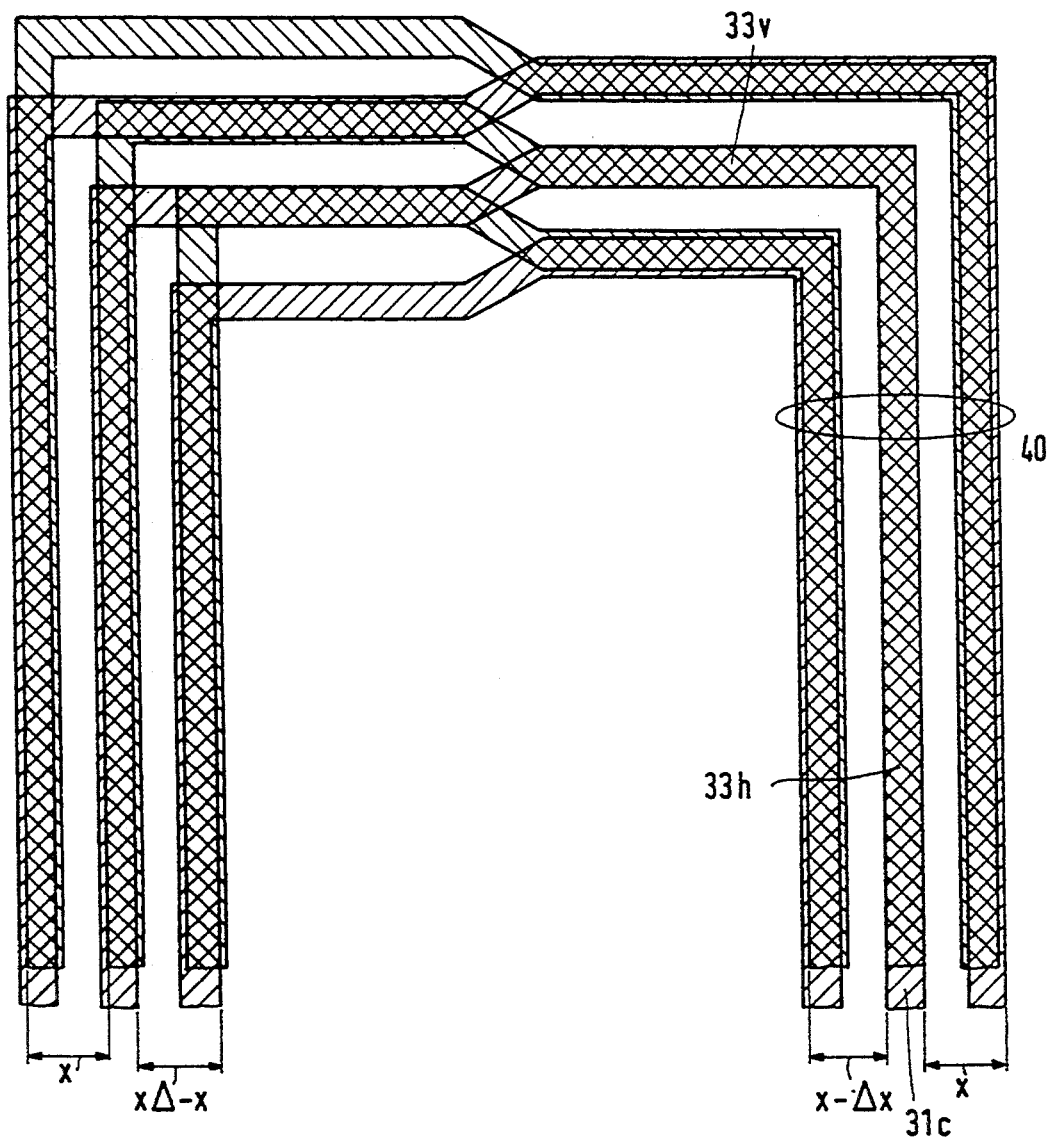
FIG. 4 shows an image of a combined alignment pattern formed by alignment patterns of two accurately aligned optoelectronic opto-electronic image sensors incorporated in an image sensing device according to the invention.

An image of a combined alignment pattern that is obtained when opto-electronic image sensors are accurately aligned is shown in FIG. 4; viz. the pattern of stripes forming the alignment pattern of the opto-electronic image sensor 12*t*, together with the alignment pattern of opto-electronic image sensor 12*r* having the same shape as the alignment pattern of opto-electronic image sensor 12*t* but seen in a mirrored way. The mirroring of alignment patterns with respect to one another is illustrated by the shadings of respective alignment patterns running in mirrored directions. As FIG. 4 shows, a central stripe 31*c* of the alignment pattern of opto-electronic image sensor 12*t* is viewed to be in coincidence with a central stripe 31*c* of a reflected alignment pattern of opto-electronic image sensor 12*r*. This is the case at an overlap 33*v* in the regions where alignment patterns are having a pitch in the vertical direction. Also, there is coincidence at another overlap 33*h* where alignment patterns are having a pitch in a horizontal direction. Thus alignment is achieved for two orthogonal direction of displacement of the opto-electronic image sensors along either output face 14*t* or 14*r* respectively, of the beam-splitter. On the other hand, non-central stripes of different opto-electronic image sensors are mismatched.

The alignment pattern described above is also suitable for accurately measuring the achieved alignment subsequently to mounting of two opto-electronic image sensors with respect to a beam-splitter. To that end, a fraction, e.g. the fraction 40 indicated in FIG. 4, of an image of alignment patterns of two opto-electronic image sensors viewed simultaneously from the input face 14*i* of the beam-splitter is inspected. This is illustrated in FIGS. 5*a–c* for an alignment pattern having a seven-fold set of stripes. When misalignment occurs, then alignment patterns of both opto-electronic image sensors viewed simultaneously, a central stripe of the alignment pattern of one opto-electronic image sensors coincides with a non-central stripe of the alignment pattern of the other opto-electronic image sensor. Because of the reflection at the reflecting face 15 in the beam-splitter the right-hand-side 32*r* of alignment pattern of the opto-electronic image sensor 12*r* is combined with the left-hand side of the alignment pattern 32*l* of the opto-electronic image sensor 12*t*. Thus, pans having different pitches of alignment patterns are combined in the pattern that is obtained when both alignment patterns of the opto-electronic image sensors 12*r* and 12*t* are viewed together. By registering the number of stripes between the non-central coinciding stripe and the central stripe of the same alignment pattern and the differences between pitches of the left-hand side pan and the right-hand-side pan of the alignment pattern the magnitude of the misalignment can be accurately measured; the accuracy is above all achieved because the two alignment patterns of the respective opto-electronic image sensors when viewed together, produce a vernier.

In FIG. 5*a* a pan is shown of a combined pattern of two simultaneously viewed seven-fold sets of stripes of alignment patterns of opto-electronic image sensors that are accurately aligned with respect to the beam-splitter. The accurate alignment is evident from the combined pattern by the coincidence of central stripes 34 and 35 of the alignment patterns of either opto-electronic image sensors. In FIG. 5*b* a pan is shown of a combined pattern of two simultaneously viewed seven-fold sets of stripes of alignment patterns of opto-electronic image sensors that are not accurately aligned with respect to the beam-splitter. The inaccuracy of the alignment is evidenced in the combined pattern by the coincidence of non-central stripes 36 and 37. In FIG. 5b, however, coincidence occurs at stripes differing one stripe from the central stripes 34 and 35, respectively. In FIG. 5c a part is shown of a combined pattern of two simultaneously viewed seven-fold sets of stripes of alignment patterns of opto-electronic image sensors that are not accurately aligned with respect to the beam-splitter. The inaccuracy of the alignment is evident from the combined pattern by the fact that coincidence of non-central stripes 38 and 39. Viz. in FIG. 5c, coincidence occurs at stripes differing two from the central stripes 34 and 35, respectively. Thus, it can be concluded that alignment in the case illustrated in FIG. 5c is worse as compared to the alignment illustrated in FIG. 5b. Moreover, employing the vernier-action in the combined alignment pattern, deviations from perfect alignment are conveniently made quantitative.

We claim:

1. An image sensing device comprising beam-splitting means for splitting an image carrying radiation beam into a plurality of sub-image carrying radiation beams, and comprising, for sensing each of the sub-images, a plurality of opto-electronic image sensors each having a circuit lay-out, characterised in that each opto-electronic image sensor is provided with an alignment pattern formed by at least part of its circuit lay-out.

2. An image sensing device as claimed in claim 1, further characterised in that said alignment pattern has a first pattern-part having a first pitch and second pattern-part having a second pitch, said first and second pitches being in the same direction and their magnitudes being different.

3. An image sensing device as claimed in claim 1, further characterised in that said alignment pattern has a first pattern-part having a first pitch and a second pattern-part having a second pitch, directions of said first and second pitches being coincident upon reflection of one of said directions by a reflection means incorporated in the beam-splitting means, and their magnitudes being different.

4. An image sensing device as claimed in claim 1, further characterised in that said alignment pattern has a first pattern-part comprising a first portion having a first pitch and a second portion having a second pitch and that said alignment pattern has a second pattern-part comprising a third portion having a third pitch and a fourth portion having a fourth pitch, directions of said first and fourth pitches being coincident upon reflection of one of said directions by a reflection means incorporated in the beam-splitting means, and their magnitudes being different, and directions of said second and third pitches being coincident upon reflection of one of said directions by said reflection means, and their magnitudes being different.

5. An x-ray examination apparatus comprising an image sensing device comprising beam-splitting means for splitting an image carrying radiation beam into a plurality of sub-image carrying radiation beams, and comprising a plurality of opto-electronic image sensors each having a circuit lay-out for sensing each of the sub-images, and comprising recombination means for recombining sub-images into a recombined image, characterised in that each opto-electronic image sensor is provided with an alignment pattern formed by its circuit lay-out.

* * * * *